June 4, 1963
P. J. HOWARD
3,091,896
CONTAINER FOR PLANTS
Filed July 18, 1960
2 Sheets-Sheet 1
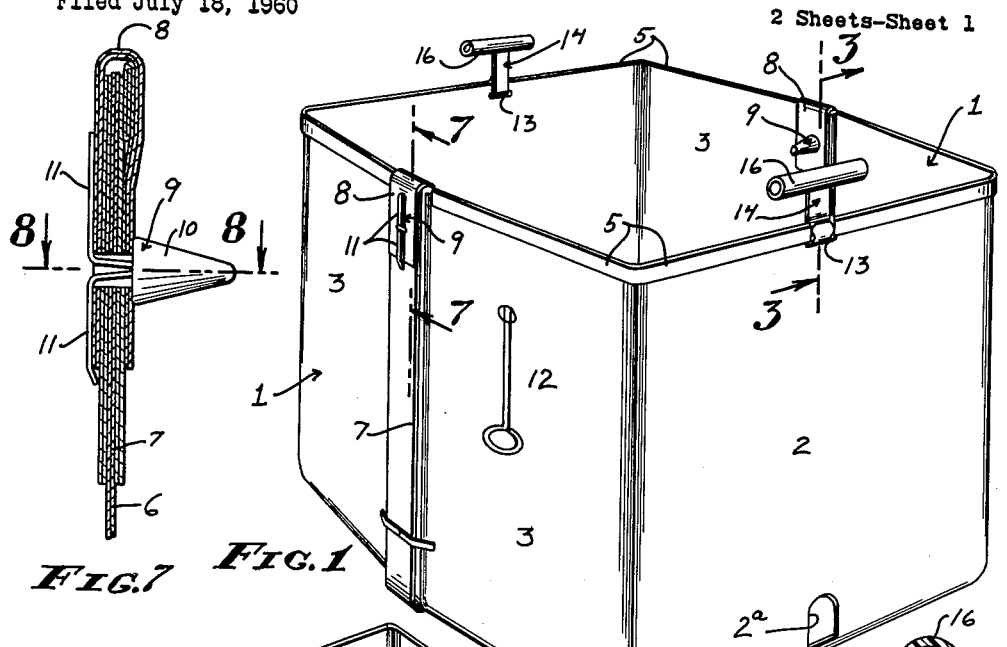
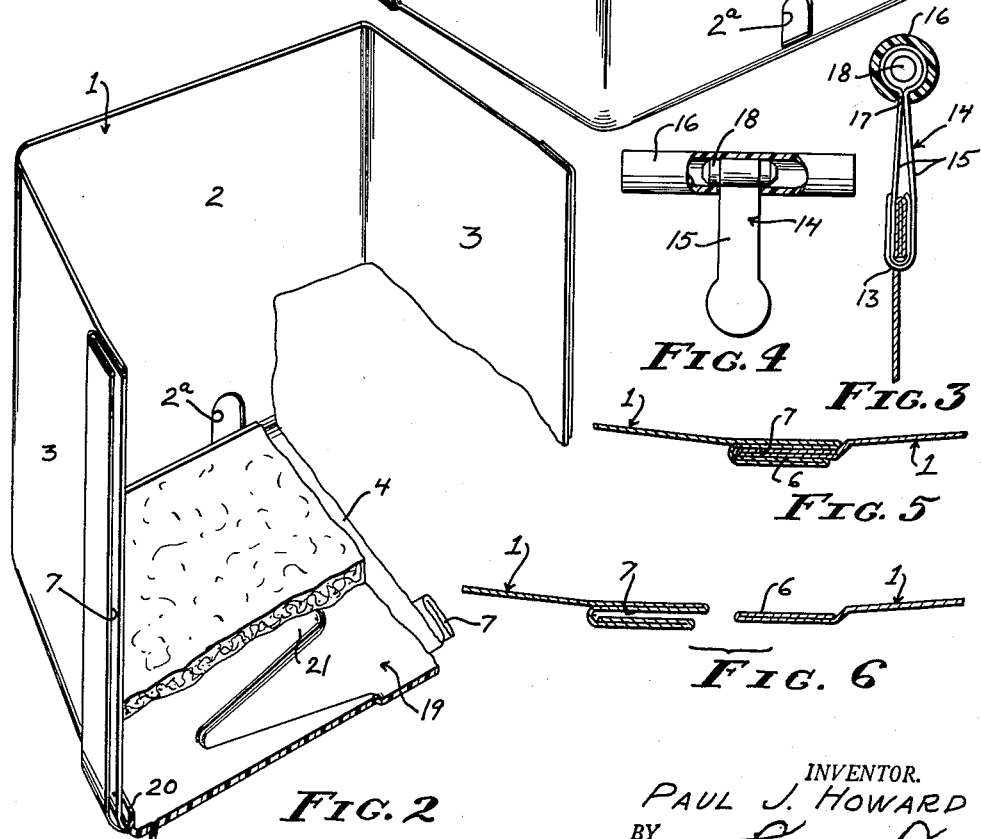
INVENTOR.
PAUL J. HOWARD
BY Lyon & Lyon
ATTORNEYS

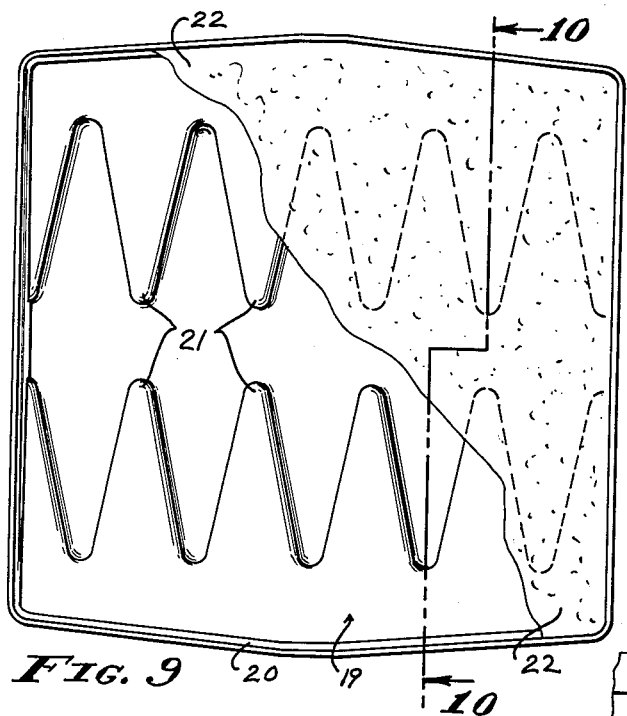
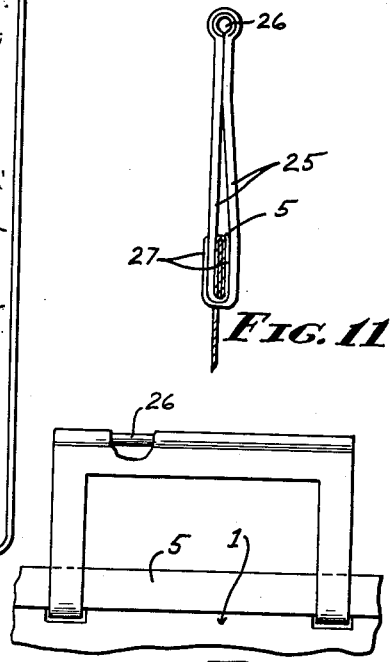
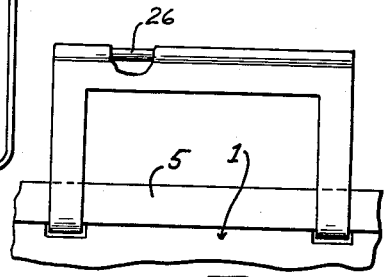
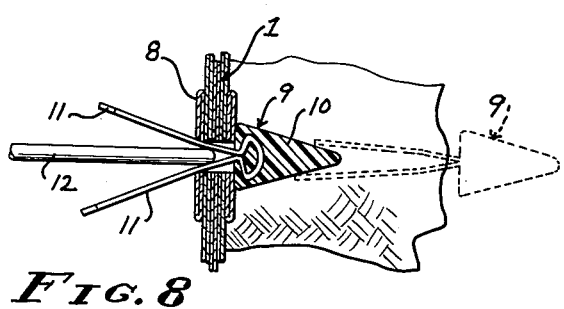
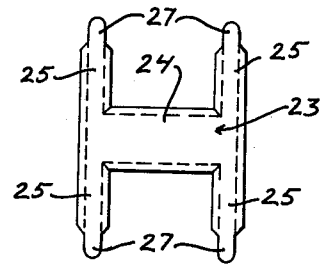
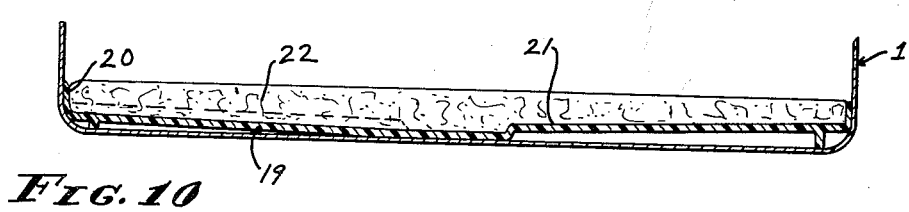

United States Patent Office 3,091,896
Patented June 4, 1963

3,091,896
CONTAINER FOR PLANTS
Paul J. Howard, 458 N. Barrington Ave.,
Los Angeles, Calif.
Filed July 18, 1960, Ser. No. 43,575
1 Claim. (Cl. 47—37)

This invention relates to containers for plants, and included in the objects of this invention are:

First, to provide a container for plants which is adapted to be separated vertically into two halves, proportioned so that they may be nestled together to facilitate transportation and storage of the empty container.

Second, to provide a container adapted to receive a plant and packed with earth to serve initially as a plant pot until the plant is to be transplated; at which time the container may be readily separated and the plant, with the earth therearound intact, removed.

Third, to provide a container for plants which eliminates the danger of injury inherent in the splitting of a conventional can-type plant container, and the substantial disturbance to the surrounding earth which necessarily occurs when the conventional can container is split for removal from around the plant.

Fourth, to provide a split container for plants which incorporates novel fastening means for securing the halves of the container together, the fastening means being so arranged for removal and separation of the container components by being readily forced from the outside of the container inwardly with a minimum disturbance of the soil.

Fifth, to provide a container for plants which includes a novel supporting and drainage member and a nutrient pad to insure proper nutrient supply to the plant and to facilitate removal of the plant from the container without damage to the bottom roots.

With the above and other objects in view, as may appear hereinafter, reference is directed to the accompanying drawings in which:

FIGURE 1 is a perspective view of the container for plants shown assembled for use;

FIGURE 2 is a fragmentary, perspective view of one section of the container;

FIGURE 3 is an enlarged, fragmentary, sectional view through 3—3 of FIGURE 1 showing one of the handle members;

FIGURE 4 is a partial sectional, partial side view thereof as it appears before attachment to the container;

FIGURE 5 is an enlarged fragmentary, sectional view through 5—5 of FIGURE 1 showing the manner in which the two sections of the container are joined, with the thickness of the material exaggerated to improve the illustration;

FIGURE 6 is a fragmentary, sectional view similar to FIGURE 5 showing the two sections of the container separated;

FIGURE 7 is an enlarged, fragmentary, sectional view through 7—7 of FIGURE 1, showing the manner in which the two sections of the container are locked together by means of a fastening device;

FIGURE 8 is a fragmentary, sectional view through 8—8 of FIGURE 7, illustrating the manner in which the fastening device is removed when it is desired to separate the sections of the container;

FIGURE 9 is a plan view of the supporting and drainage plate showing the nutrient pad fragmentarily thereon;

FIGURE 10 is an enlarged, fragmentary, sectional view through 10—10 of FIGURE 9, showing the supporting and drainage plate and the nutrient pad in position within one section of the container;

FIGURE 11 is an end view of a modified form of handle with the adjacent portion of the container shown in section and corresponding to FIGURE 3;

FIGURE 12 is a side view of the modified handle with a portion thereof broken away to indicate its internal construction;

FIGURE 13 is a reduced, developed view of the modified handle.

The container for plants comprises a pair of complementary container sections 1, each including an end wall 2, partial side walls 3, and a partial bottom wall 4. Each container section is provided with a folded upper margin 5.

The extended margins of the side walls 3 and bottom wall 4 of one of the container sections is provided with a tongue 6 formed by folding the metal upon itself to provide a folded edge. The extended margin of the side walls 3 and bottom wall 4 of the other container section is folded in such a manner as to form a channel 7. As will be seen best in FIGURES 2, 5, and 6, the channel 7 is formed by doubling the extreme portion of the margin upon itself to form a folded edge, then folding the margin again upon itself to form the channel, and then folding the channel member thus formed so that it lies outwardly of the resulting margin of the side walls 3 and bottom wall 4. The tongue 6 may be offset slightly from the normal surface of its corresponding side wall and bottom wall so that the tongue 6 and channel 7 align with each other, as shown in FIGURE 6.

When the two container sections are joined, it will be observed (as shown in FIGURE 4) that the inner surfaces of the complementary side walls 3 are essentially flush with each other. This is desirable, as it aids in removing the plant and the soil in which it is placed, from the container sections when the container sections are separated, as will be described in more detail hereinafter.

It is also preferred to arrange the side walls 3 so that they diverge slightly towards their respective tongues and channels, whereby when the container sections are separated they may be nestled, one in the other, to permit a large number of containers to be stacked in a minimum of space.

The upper extremities of the tongue 6 and channel 7 are reinforced by top clips 8 formed of foldable strips of metal which extend over the top edges of the container when the container sections are joined, as shown best in FIGURES 1 and 7.

The container sections are secured together by means of fastening elements 9 which extend through accommodation openings provided in the tongue 6 and channel 7, near the upper and lower portions of the side walls 3. The upper fastening elements preferably extend through the top clips 8 as well as the tongue 6 and channel 7, as shown in FIGURE 7.

Each fastening element 9 includes a conical head 10 disposed within the container and bendable legs 11 which may be extended outwardly through the accommodation openings, and then spread outwardly from each other to lock the fastening elements 9 in place.

The fastening elements 9 are adapted to be removed by a push bar 12 which may be initially attached to the side of one of the container sections 1 so as to be readily removed. For example, the push bar may be attached by a weakened portion so that it may be pulled free of the container section. The push bar is utilized as shown best in FIGURE 8, by insertion between the legs 11 so as to push the legs backward or inward through the accommodation openings and force the conical or tapered head 10 into the soil which fills the container.

Each end wall 2 is provided below its folded upper margin 5 with a slit 13 which is adapted to receive a handle 14. The handle 14 includes a strip 15 which may be folded at its mid-portion for insertion into a tubular element 16, through a slit 17 formed in the tubular element. A retainer pin 18 is thrust through the folded mid-portion of the strip 15 to secure the strip in the tubular element 16. The extremities of the foldable strip 15 are adapted to be inserted in opposite directions through the slit 13 in the corresponding container section 1 and folded upon themselves, as shown in FIGURE 3.

The end walls 2 are provided near the bottom walls 4 with drain openings 2a. Supported on the two bottom walls of the complementary container sections 1 is a supporting and drainage plate 19 which may be molded of plastic material and includes a shallow marginal rim 20 conforming to the walls of the container sections 1. The drainage plate 19 is molded so that it slopes downwardly towards a central axis aligned with the drain openings 18, and may be provided with relatively shallow V-shaped ribs to form a series of drainage channels 21.

The plate 19 is adapted to receive a nutrient pad 22 which may be formed of porous material capable of retaining various nutrients for the benefit of the plant to be carried in the container.

The plant container is utilized as follows:

The two container sections 1 are joined together and secured by the fastening elements 9. The drainage plate 19 and nutrient pad 22 are placed in the bottom thereof. The container thus formed is filled with soil and a plant is established in the soil. After a period of growth of the plant, and when it is desired to transplant the plant from the container, the fastening elements 9 are removed by forcing each of them inwardly into the soil, as indicated in FIGURE 8. The container sections 1 may then be slipped apart while the soil rests on the nutrient pad. The soil remains virtually intact so that damage to the roots of the plant during the transplanting operation is minimized or completely avoided.

It will be observed that, by reason of the fact the two complementary sections 1 may be readily separated and that no cutting nor slitting down the sides of the container is required, danger of injury to the workman because of contact with the sharp or jagged edges of a cut container is avoided; and furthermore, by reason of the fact that the soil remains intact the plant is fully protected. Still further, by reason of the fact that the two container sections 1 nestle readily into each other, a large number of containers may be stacked in a small space and returned to the nursery for refilling.

Reference is directed to FIGURES 11, 12, and 13, which illustrate a modified handle utilizing a pair of slits in the container section. The modified handle is formed from a H-shaped blank 23 illustrated in FIGURE 13. The blank is folded along its cross portion 24 to form adjacent leg portions 25. It is preferred to fold the blank over a reinforcing wire 26 and to fold the margins thereof to avoid raw edges. However, the tips 27 of the leg portions 25 do not have folded edges, so they may be bent after insertion through the slits provided in the container sections 1 and folded upon themselves in the manner of the first described handle 14, that is, as shown in FIGURE 11.

While particular embodiments of this invention have been shown and described, it is not intended to limit the same to the exact details of the constructions set forth, and it embraces such changes, modifications, and equivalents of the parts and their formation and arrangement as come within the purview of the appended claim.

What is claimed is:

A container for plants, comprising: a pair of complementary container members having interengaging margins with overlapping portions extending across the bottom and vertically along opposite sides of said container; said overlapping portions having aligned openings therethrough; and a plurality of fastening devices, each including pointed heads disposed within said container and bendable legs extending loosely through said aligned openings, said heads of said fastening devices being adapted to be forced into soil filling said container members as said legs are pushed inwardly through said openings, to extract said legs from said openings thereby to separate said container members.

References Cited in the file of this patent

UNITED STATES PATENTS

| | | |
|---|---|---|
| 312,159 | Perkins | Feb. 10, 1885 |
| 548,763 | Simpson | Oct. 29, 1895 |
| 861,046 | Norum | July 23, 1907 |
| 876,235 | Quackenboss | Jan. 7, 1908 |
| 2,594,307 | Valenzuela | Apr. 29, 1952 |
| 2,818,681 | Coplen | Jan. 7, 1958 |
| 2,960,799 | Schneider | Nov. 22, 1960 |
| 2,968,124 | Coplen | Jan. 17, 1961 |

FOREIGN PATENTS

| | | |
|---|---|---|
| 494,694 | Germany | Mar. 13, 1930 |